(12) United States Patent
Eckstein et al.

(10) Patent No.: US 8,151,444 B2
(45) Date of Patent: Apr. 10, 2012

(54) METHOD FOR MANUFACTURING CONNECTING DEVICE FOR RANDOMLY CONNECTING A NUMBER OF TRANSMITTERS AND RECEIVERS

(75) Inventors: Gerald Eckstein, München (DE); Oliver Freudenberg, München (DE); Alexander Frey, München (DE); Ingo Kühne, München (DE)

(73) Assignee: Siemens Aktiengesellschaft, Munich (DE)

( * ) Notice: Subject to any disclaimer, the term of this patent is extended or adjusted under 35 U.S.C. 154(b) by 818 days.

(21) Appl. No.: 12/159,015

(22) PCT Filed: Sep. 27, 2007

(86) PCT No.: PCT/EP2007/060245
§ 371 (c)(1),
(2), (4) Date: Jun. 24, 2008

(87) PCT Pub. No.: WO2008/037759
PCT Pub. Date: Apr. 3, 2008

(65) Prior Publication Data
US 2008/0291938 A1 Nov. 27, 2008

(30) Foreign Application Priority Data
Sep. 29, 2006 (DE) .......................... 10 2006 046 206

(51) Int. Cl.
*H01H 59/00* (2006.01)
*H01H 63/33* (2006.01)
*H01H 65/00* (2006.01)
*H04Q 3/52* (2006.01)

(52) U.S. Cl. ............... 29/622; 29/830; 29/847; 200/181
(58) Field of Classification Search .................. 29/622, 29/846, 847, 830; 200/181
See application file for complete search history.

(56) References Cited

U.S. PATENT DOCUMENTS

| 6,872,902 | B2 * | 3/2005 | Cohn et al. ................. 200/181 |
| 7,138,293 | B2 * | 11/2006 | Ouellet et al. ............... 438/106 |
| 2003/0038547 | A1 | 2/2003 | Reinhardt et al. |
| 2004/0016995 | A1 | 1/2004 | Kuo et al. |
| 2004/0228468 | A1 | 11/2004 | Cook |

* cited by examiner

Primary Examiner — Livius R Cazan
(74) Attorney, Agent, or Firm — Schiff Hardin LLP

(57) ABSTRACT

A connection device for random connection of a first member of first transmission/reception units with a second number of second transmission/reception units has a switching matrix that includes a third number of controllable micromechanical switching elements that are respectively activatable to establish a connection between one of the first transmission/reception units and one of the second transmission/reception units. A control circuit selectively activates the respective micromechanical switching elements to selectively establish respective connections between the first number of first transmission/reception units and the second number of transmission/reception units.

9 Claims, 5 Drawing Sheets

METHOD FOR MANUFACTURING CONNECTING DEVICE FOR RANDOMLY CONNECTING A NUMBER OF TRANSMITTERS AND RECEIVERS

BACKGROUND OF THE INVENTION

1. Field of the Invention

The present invention concerns a connection device for random connection of a first number of first transmission/reception units with a second number of second transmission/reception units. The invention also concerns a communication device with at least one first transmission/reception unit and at least one second transmission/reception unit, as well as with a connection device for selective establishment of an electrical connection between the at least one first transmission/reception unit and the at least one second transmission/reception unit. The invention also concerns a method to produce a connection device.

2. Description of the Prior Art

Communication devices to transfer information include at least one first transmission/reception unit as well as at least one second transmission/reception unit. In the simplest case, one of the first transmission/reception units is respectively connected with one of the second transmission/reception units into a channel. In communication devices with multiple transmission channels, a multiplexing method is advantageous with regard to the optimization of costs and the necessary transmission lines. Using such a method, multiple first transmission/reception units can randomly be connected with a second transmission/reception unit, the number of the system components is reduced. In other situations it is necessary to transfer information in parallel between a plurality of first transmission/reception units and a number of second transmission/reception units, and the association of first transmission/reception units and second transmission/reception units must be random. This applies in telephone communication, for example. Such a requirement can be satisfied with a spatial multiplexing method. FIG. 1 shows an arrangement known as a crossbar distribution in a communication device in a schematic presentation. First transmission/reception units are labeled with the reference characters SE1-1, SE2-1, SE3-1 and SE4-1 in FIG. 1. The first transmission/reception units SE1-1, . . . , SE4-1 are coupled with input lines LE1, LE2, LE3, LE4. Second transmission/reception units are labeled with the reference characters SE1-2, SE2-2, SE3-2 and SE4-2 in FIG. 1. The second transmission/reception units SE1-2, . . . , SE4-2 are respectively coupled with an output line LA1, LA2, LA3, LA4. In this exemplary embodiment the number of the first transmission/reception units SE1-1, . . . , SE4-1 is selected corresponding to the number of the second transmission/reception units SE1-2, . . . , SE4-2. This is only an example. The number of the first and second reception units can in principle be selected arbitrarily.

A switching matrix SM is provided for random connection of the first transmission/reception units SE1-1, . . . , SE4-1 and the second transmission/reception units SE1-2, . . . , SE4-2. The switching matrix SM comprises a respective switching element (not shown) at the node points K11, K12, K13, K14, . . . , K41, K42, K43, K44 (in general Kij, wherein i is the number of the input lines and j is the number of the output lines). An electrical connection of the input line and output line intersecting in the node point is thereby effected by a switching element arranged at a node point Kij.

A specific one of the first transmission/reception units SE1-1, . . . , SE4-1 can be electrically connected in parallel with a specific one of the second transmission/reception units SE1-2, . . . , SE4-2 by appropriate activation of respective switching elements by a control circuit (not shown in FIG. 1). This is represented by way of example in FIG. 1 by the communication paths labeled with the reference characters P1, . . . , P4. The first transmission/reception unit SE1-1 is connected with the second transmission/reception unit SE2-2 with the communication path P1. The first transmission/reception unit SE1-1 represents a transmitter and the second transmission/reception unit SE2-2 a receiver, which is indicated by the arrow direction. The electrical connection ensues in that the switching element arranged at the node point K12 is switched to be conductive while the further switching elements in the node points K11, K22, K32 and K42 arranged in the communication path T1 are switched to be blocking.

A communication path P2 between the first transmission/reception unit SE2-1 and the second transmission/reception unit SE1-2, between the first transmission/reception unit S3-1 and the second transmission/reception unit SE302 and between the first transmission/reception unit SE4-1 and the second transmission/reception unit SE4-2 is formed in a corresponding manner. In the shown exemplary embodiment the first transmission/reception units SE2-1 and SE4-1 represent receivers while SE3-1 forms a transmitter. Corresponding to this, the second transmission/reception units SE1-2 and SE4-2 represent transmitters and SE3-2 represents a receiver.

A general requirement of a switching matrix as described in FIG. 1 is that the multiplexing method does not influence the actual signal transmission. The switching elements necessary for the multiplexing possess parasitic elements, a resistor and a capacitor. The capacitor in particular thereby represents an unwanted leak path for high frequencies in the range of more than 100 MHz, which leads to signal losses. A signal integrity problem therefore results, in particular in the transfer of radio-frequency signals.

In order to avoid signal losses, switching elements with low parasitic capacitances have previously been used, or the effect of the parasitic capacitances is actively compensated via corresponding circuit arrangements. Switches with low parasitic capacitances are, for example, PIN diodes that, however, possess the disadvantage of very high initial costs. Although the provision of structural elements to reduce the parasitic capacitances is more cost-effective, it exhibits the disadvantage that the space requirement for the switching matrix rises. The space requirement assumes a magnitude that is no longer tolerable, in particular when switching matrices for random connection possess a large number of first and second transmission/reception units.

SUMMARY OF THE INVENTION

An object of the present invention is to provide a connection device for random connection of transmission/reception units as well as a communication device given which a signal transmission (in particular of radio-frequency signals) leads to no or only slight signal losses. These objects should simultaneously be realized with low space requirements.

A further object of the invention is to provide a method for production of a connection device of the aforementioned type which can be realized in a simple and cost-effective manner.

A connection device according to the invention for random connection of a first number of transmission/reception units with a second number of transmission/reception units has a switching matrix that has a third number of controllable micromechanical switching elements (wherein an electrical connection between one of the first transmission/reception units and one of the second transmission/reception units can be established by activating a switching element) and a control circuit for selective activation of each of the micromechanical switching elements.

The reduction of signal losses given radio-frequency signals with simultaneously minimal space requirements for a connection device according to the invention results due to the use of micromechanical switching elements. These are combined in a system known as a MEMS (Micro-Electro-Mechanical System) that is formed by a combination of mechanical elements and electronic elements on a substrate or, respectively, semiconductor chip. Micromechanical switching elements are structural elements with a low parasitic capacitance and therefore are particularly suitable for the transfer of radio-frequency signals. The possibilities of microsystem engineering thereby allow a miniaturized and cost-effective realization of a switching matrix.

In the framework of the present invention, the term switching element is to be understood such that both switches and relays are comprised. The switching elements are respectively arranged at an intersection point of the input lines and the output lines and connect the respective input line with the output line given corresponding activation.

The third number of controllable micromechanical switching elements is measured according to the first number of the first transmission/reception units that are connected with input lines and the second number of second transmission/reception units that are connected with output lines. In general, the third number of switching elements results from the multiplication of the first number of first transmission/reception units with the second number of second transmission/reception units. A connection device according to the invention therefore comprises at least one switching element if only one first transmission/reception unit and one second transmission/reception unit are provided.

The control circuit can be formed by an ASIC (Application Specific Integrated Circuit), for example, which serves for the electrical activation of the individual switching elements of the switching matrix.

According to an embodiment, the switching matrix and the control circuit are fashioned as integrated components in a common substrate. An integrated system that can be produced cost-effectively and is optimized (with regard to its space requirement) for the multiplexing of radio-frequency signals results via the direct integration of the switching elements with the components of the control circuit. The switching elements of the switching matrix are appropriately fashioned or producible in a CMOS-compatible process. The connection device is operable with a frequency of more than 100 MHz, more preferably with a frequency of more than 300 MHz.

According to a further embodiment, to control the micromechanical switching elements the control circuit has a level adaptation circuit that generates the voltage necessary to activate the micromechanical switching elements. The control circuit appropriately comprises a position register in which a circuit pattern for activation of all switching elements can be written. The bit width of the position register is thereby dimensioned according to the size of the switching matrix in order to enable a simultaneous activation of all node points.

It is advantageous for the control circuit to have a memory in which a number of predetermined circuit patterns are stored for activation of the switching elements of the switching matrix, wherein the circuit patterns stored in the memory can be fed to the position register. The provision of the memory with the circuit patterns stored therein provides the advantage that a very fast activation of the switching matrix is possible. Independent of this, it is naturally also conceivable for the position register to be written with a circuit pattern on a case-by-case basis via a data line.

In principle the technical design of the micromechanical switching elements can be of an arbitrary nature. Micromechanical switching elements are preferably used that can be activated by means of an electrical field effect. Alternatively, the micromechanical switching elements can also be activatable by means of a piezoelectric effect.

A communication device according to the invention comprises at least one first transmission/reception unit and at least one second transmission/reception unit as well as a connection device for selective establishment of an electrical connection between the at least one first transmission/reception unit and the at least one second transmission/reception unit, wherein the connection device is fashioned as described above. The same advantages therefore apply as were described above.

A method according to the invention to produce a connection device for the random connection of a first number of transmission/reception units with a second number of transmission/reception units, wherein the connection device comprises a switching matrix and possesses a control circuit for selective activation of each of the micromechanical switching elements, includes the following steps: prepare a first wafer in which the control circuit is fashioned, and fashion a first electrically-conductive layer on a top side of the first wafer, wherein the first conductive layer for each switching element has at least one first electrode for electrostatic actuation, a first electrode for a load circuit and a first electrode for the connection to a control circuit; prepare a second wafer and fashion a second electrically-conductive layer on a front side of the second wafer, wherein the second conductive layer has at least one second electrode for electrostatic actuation and a second electrode for the load circuit for each switching element; connection of the first and the second wafers with one another such that an electrical connection is established between the first electrode for the connection to the control circuit and the second electrode for the electrostatic actuation.

The first electrode for electrostatic actuation and the first electrode for the connection to the control circuit are thereby connected with the control circuit. An electrical connection of the first electrode for the load circuit with the control circuit is not necessary.

The method to produce a connection device according to the invention can be implemented using known technologies. The integration of the functionality of the switching matrix into a wafer which contains the control circuit ensues through further processing of this wafer and the preparation and processing of a second wafer that is connected with the first wafer in a second processing step. The connection ensues with known bonding mechanisms, for example. The use of manufacturing processes that are known from semiconductor manufacturing enables the formation of arbitrarily large switching matrices in a simple manner. The control of the switching elements of the switching matrix via the control circuit in the first wafer is possible in a simple manner via metal layers fashioned in the first wafer. A connection device which exhibits a significantly smaller space requirement in comparison to conventional connection devices can hereby be produced in a cost-effective manner.

According to another embodiment, the first wafer is planarized on the top side before the formation of the first electrically-conductive layer, in particular via a chemical-mechanical method (chemical mechanical polishing).

According to a further advantageous embodiment, at least one indentation whose size is dimensioned according to the area of the switching element is generated on the top side of the first wafer before the fashioning of the first electrically-conductive layer, wherein at least one opening which uncovers a metal layer provided in the first wafer is fashioned inside the at least one indentation.

In a further method step, the first electrode for the connection to the control circuit is galvanically reinforced at least in part. In a later method step the electrical connection to the electrically-conductive layer on the second wafer is established via the galvanic reinforcement.

The second wafer is advantageously formed by an SOI substrate. SOI stands for Silicon On Insulator. The SOI technique is a known design for circuits of silicon transistors. These are located on an insulating material, whereby shorter switching times and lower power consumptions result. In contrast to conventional circuits that are produced directly on the silicon wafer, the transistors on an insulator layer have a lower capacitance, such that the charges required up to switching are reduced. Higher clock rates are enabled via the switching times so reduced. At the same time the power consumption is reduced, so smaller heat losses result. For example, for production a silicon wafer is thermally oxidized then a second wafer with its monocrystalline surface is placed on its oxide layer.

In a further method step an insulation layer is applied on the second wafer. This is structured in a subsequent processing step so that the subsequently applied second electrically-conductive layer (in particular a metal layer) is arranged below the surface of the insulation layer. The formation of the second electrodes advantageously ensues by structuring the second conductive layer.

In a further method step an extension is produced in the second wafer in that a channel is introduced from the front side of the second wafer up to a buried insulation layer. Finally, the second wafer is subjected to a grinding and etching process from the back side so that the extension can be deflected upon application of force.

DESCRIPTION OF THE PREFERRED EMBODIMENTS

Figure 1:
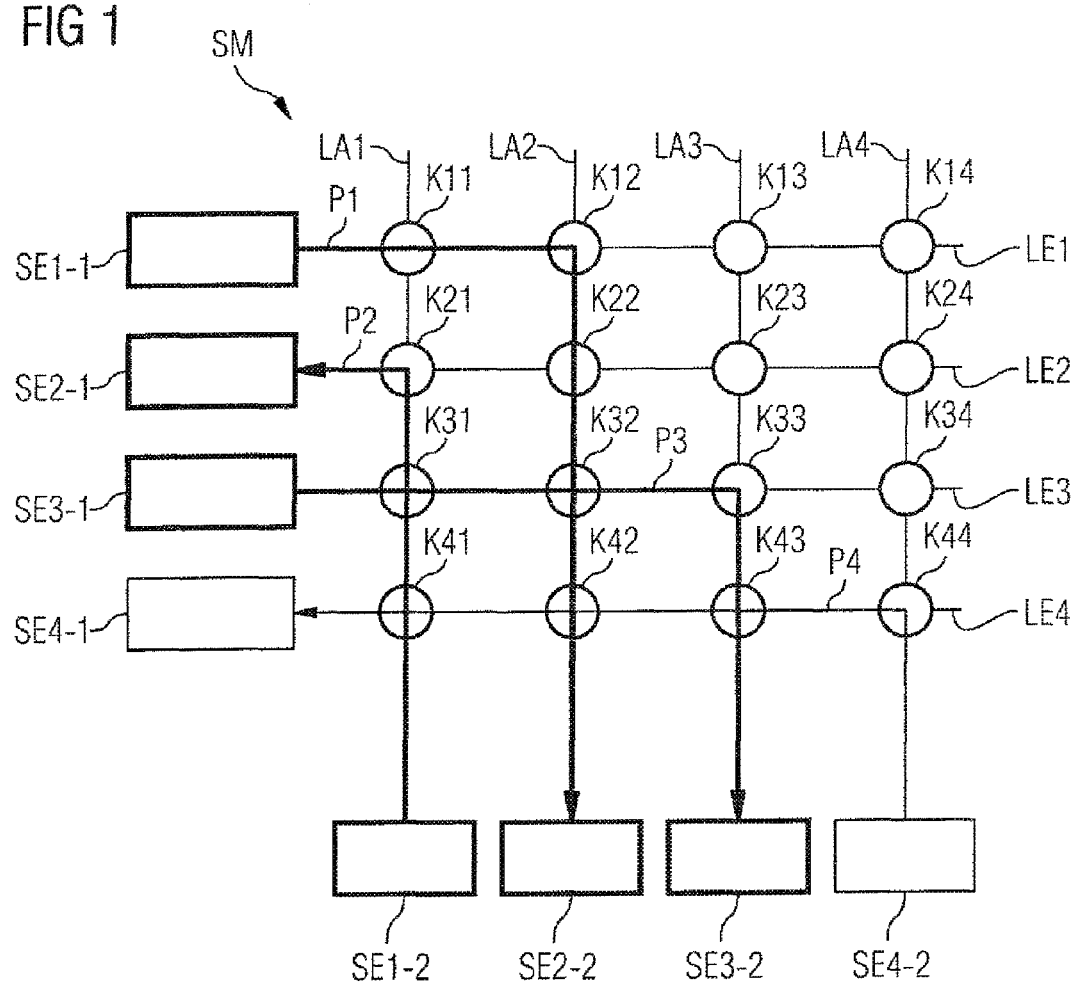
FIG. 1 schematically illustrates a known crossbar distribution for implementation of a spatial multiplexing method.
Figure 2:
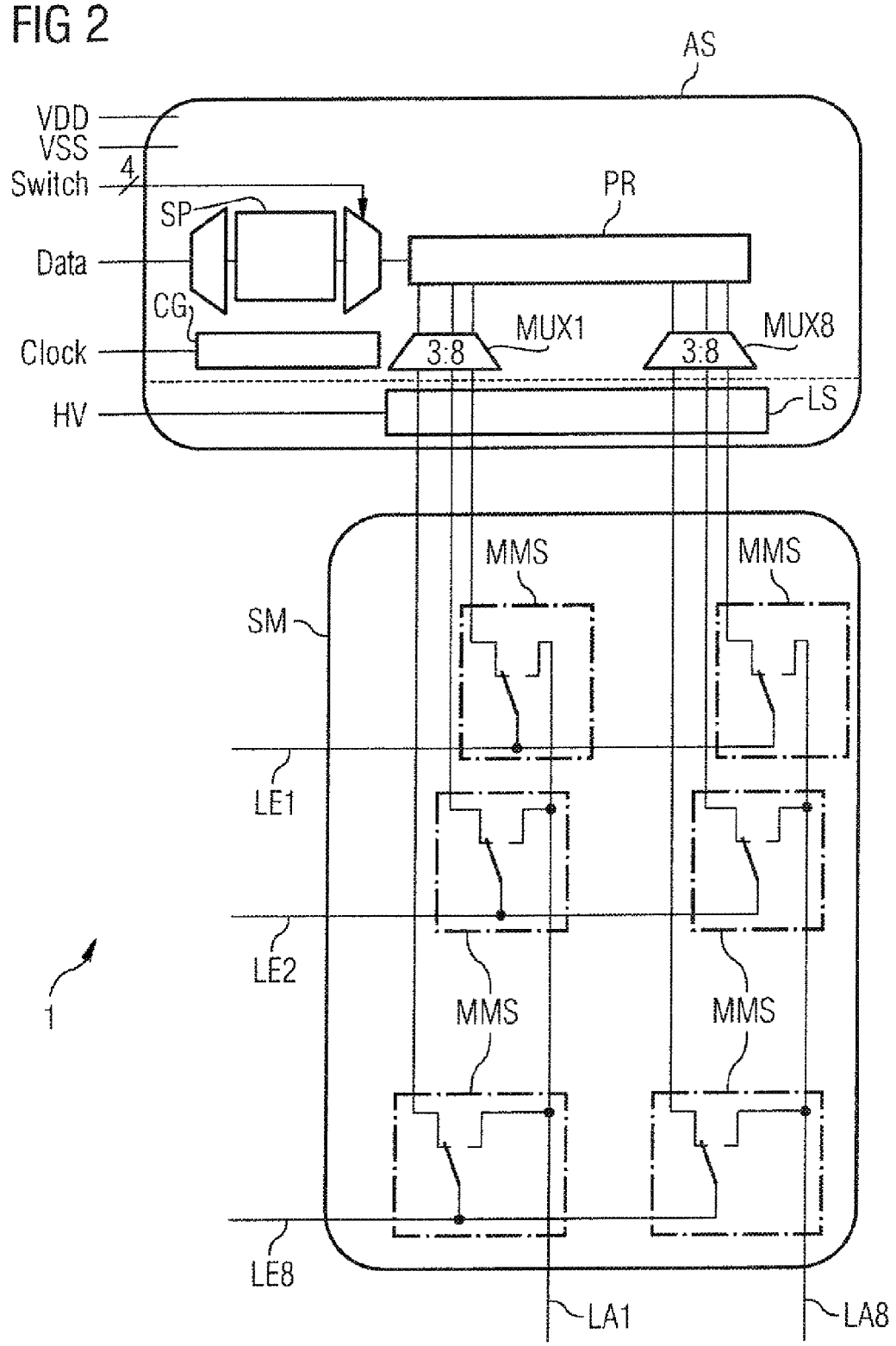
FIG. 2 schematically illustrates a connection device according to the present invention.

A connection device 1 according to the invention for implementation of a spatial multiplexing method (for example given a crossbar distribution) is presented in FIG. 2 in a schematic manner. The connection device 1 has a switching matrix SM as well as a control circuit AS. The switching matrix SM exemplarily comprises 8×8 micromechanical switching elements MMS. These are arranged at node points of eight input lines LE1, . . . , LE8 and eight output lines LA1, . . . , LA8. For clarity's sake only a few of the micromechanical switching elements MMS are shown by way of example in the switching matrix SM of FIG. 2. Each of the switching elements MMS is selectively controllable via the control circuit AS.

A micromechanical switching element MMS has three electrodes, of which one electrode is connected with the control circuit AS, a second electrode is connected with one of the input lines LEi (i=1 through 8) and the third electrode is connected with an output line LAi (i=1 through 8). Upon activation of the electrode of a switching element MMS that is connected with the control circuit AS, a short is produced between the second and third electrodes so that an electrical connection is established between the appertaining input line LEi and the appertaining output line LAi.

The control of the switching matrix SM thereby ensues such that respectively only one switching element MMS of an output line LAi and one input line LEi are activated.

To control a switching element the control circuit AS possesses a number of multiplexers MUX1, . . . , MUX8. In the exemplary embodiment a switching element MMS must respectively be selected in eight switch columns. 3 bits are necessary to address the eight switch columns, such that the activation ensues via 3:8 multiplexers. Overall 24 bits (8 columns×3 bits) are thus required for the random addressing of the 8×8 switching matrix SM. Such a "circuit pattern" is stored in a position register PR coupled with the multiplexers MUX1, . . . , MUX8.

The position register PR can be written to via a data line Data. The data line Data can be fashioned as a bus or individual line. In the exemplary embodiment the control circuit AS contains an internal memory SP in which a number of predefined circuit patterns are stored. The memory SP is therefore connected with the data line Data and furthermore via a line with the position register PR. Which of the circuit patterns stored in the memory SP should be written into the position register PR can be selected via a selection line that is coupled with the output of the memory SP. The selection line Switch is 4 bits wide for this purpose in the exemplary embodiment.

The control circuit AS is operated with two voltage levels VDD and VSS which are applied at a supply potential line and a reference potential line. The components of the control circuit AS operate with CMOS voltage levels, normally 5V. The higher (by comparison) voltages (for example 60V) required to control the micromechanical switching elements (what are known as MEMS switches or relays) are generated at the output of the control circuit AS with a level adaptation circuit LS. The level adaptation circuit LS is also designated as a "Level Shifter" and possesses for this purpose a voltage line HV at which a corresponding voltage signal is applied. Moreover, the control circuit AS comprises in a known manner a clock generator CG which is connected with a clock line Clock.

Figure 3A:
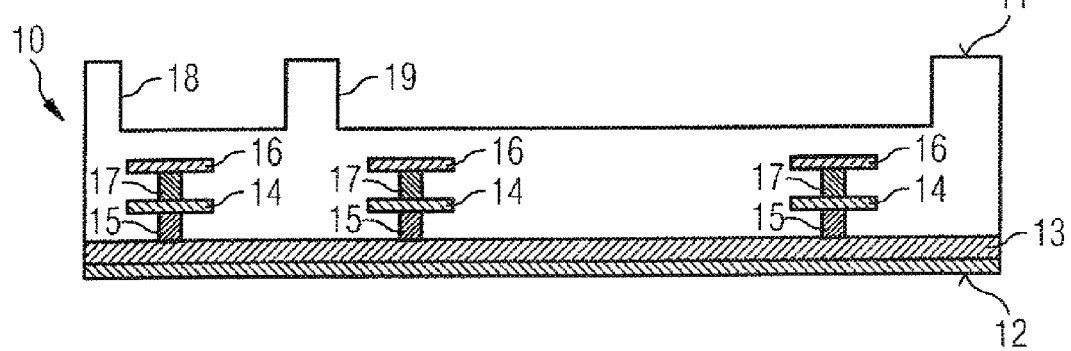
FIGS. 3A, 3B, 3C and 3D respectively show successive manufacturing steps in the processing of a first wafer in which a control circuit of the connection device in accordance with the present invention is formed.

The manufacture of a connection device according to the invention is described in the subsequent FIGS. 3A though 5B, wherein for illustrative purposes only a single switching element is shown. However, the method according to the invention is also applicable independent of this for an entire switching matrix.

The method according to the invention is characterized by the switching elements of the switching matrix being integrated into a common substrate together with the components of the control circuit.

Starting material (see FIG. 3A) is a planarized first wafer 10. The planarization ensues on a top side 11 of the first wafer 10. The planarization ensues, for example, by means of chemical-mechanical polishing (CMP). CMOS structures which exemplarily extend over the entire surface of the first wafer 10 are fashioned in the region of a back side 12 of the first wafer 10. The CMOS structures are labeled with the reference character 13. A number of metal layers that are at least partially connected with one another via feedthroughs is fashioned in a known manner within the substrate of the first wafer 10. In the present exemplary embodiment only two metal layers 14, 16 are exemplarily and schematically shown that can be connected with one another via feedthroughs 15, 17.

Figure 3B:
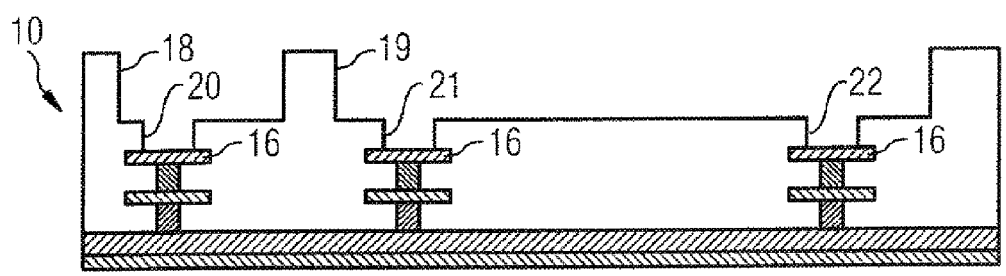

To produce a connection device according to the invention, in a first step two indentations 18, 19 are generated from the top side 11 of the first wafer 10, which two indentations 18, 19 define the area for a switching element as well as serving for the contacting of electrodes to be generated later. Segments of the metal layers 14, 16 are arranged below the indentations 18, 19. An electrical contact of the control circuit with the switching element to be generated ensues via the metal layers 14, 16 and via contacts 15, 17. For this purpose openings 20, 21, 22 to the metal layer 16 are generated within the indentations 18, 19, as this is shown in FIG. 3B.

Figure 3C:
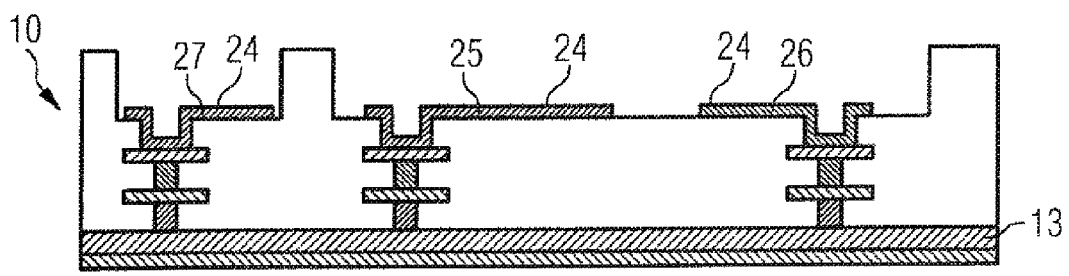

The generation of an electrically-conductive layer 24 follows (see FIG. 3C), wherein a first electrode 25 for electrostatic actuation, a first electrode 26 for connection to a load circuit and a first electrode 27 for connection to the control circuit are fashioned by structuring the electrically-conductive layer 24. As is clear from FIG. 3C, the first electrode 27 for the connection to the control circuit lies in the first indentation 18 while the electrodes 24, 25 are arranged in the adjacent indentation 19. Contrary to the graphical representation, an electrical contact between the first electrode 26 for the load circuit and the control circuit within the CMOS structure 13 is not necessary or reasonable.

Figure 3D:
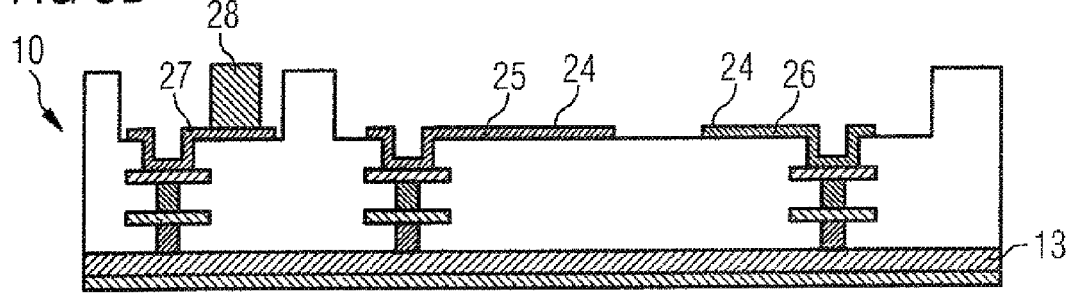

For the purpose of a subsequent electrical contact, a region of the first electrode 27 for the connection to the control circuit is galvanically reinforced (which is represented with the reference character 28) in a further method step that is presented in FIG. 3D.

Figure 4A:
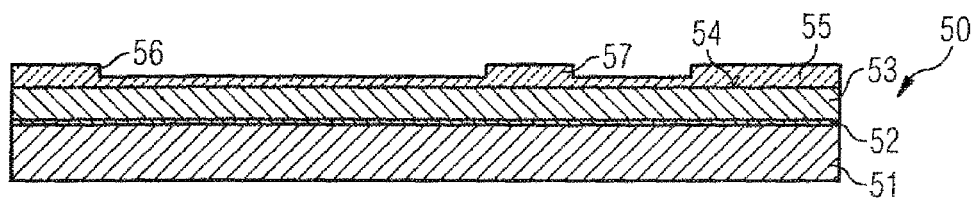
FIGS. 4A, 4B, 4C and 4D respectively show successive steps in the processing of a second wafer to fashion subcomponents of a micromechanical switch in the connection device in accordance with the present invention.
Figure 4B:
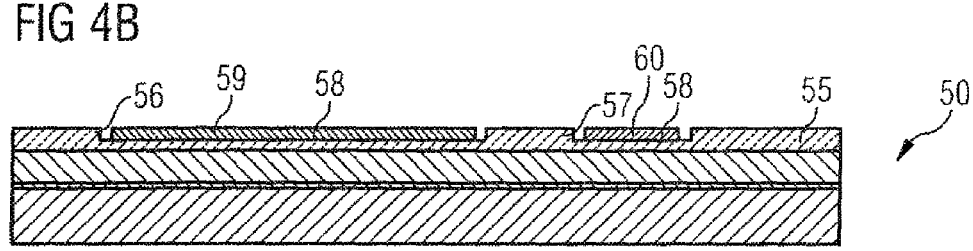
Figure 4C:
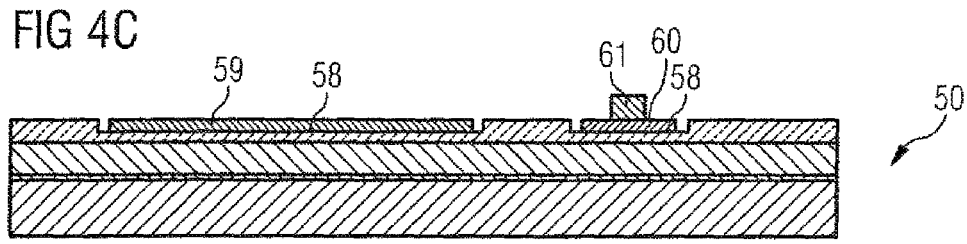
Figure 4D:
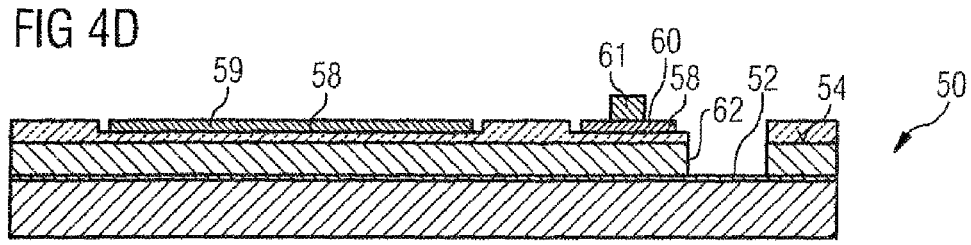

The processing of a second wafer that is fashioned as an SOI substrate is presented in FIGS. 4A through 4B. An insulation layer 55 is applied on the SOI substrate (Silicon On Insulator) 50 that has a first semiconductor layer 51 made of Si, an insulation layer 52 made of $SiO_2$ applied thereon and a semiconductor layer 53 made of Si applied on said insulation layer 52. The insulation layer 55 can, for example, likewise be formed from $SiO_2$. The insulation layer 55 is structured in the manner shown in FIG. 4A, such that indentations 56, 57 are fashioned. As FIG. 4B shows, an electrically-conductive layer 58 is introduced into the indentations 56, 57, wherein a second electrode 59 for electrostatic actuation and a second electrode 60 for the load circuit are produced by a structuring of the metal layer 58. As shown in FIG. 4C, a switch contact surface 61 is structured on the second electrode 60 for the load circuit via galvanic reinforcement. In a further method step that is shown in FIG. 4D, a channel 62 is introduced from a front side 54 of the SOI substrate until the insulation layer 52 is uncovered. An extension 63 is hereby enabled (as is better shown by FIG. 5B).

Figure 5A:
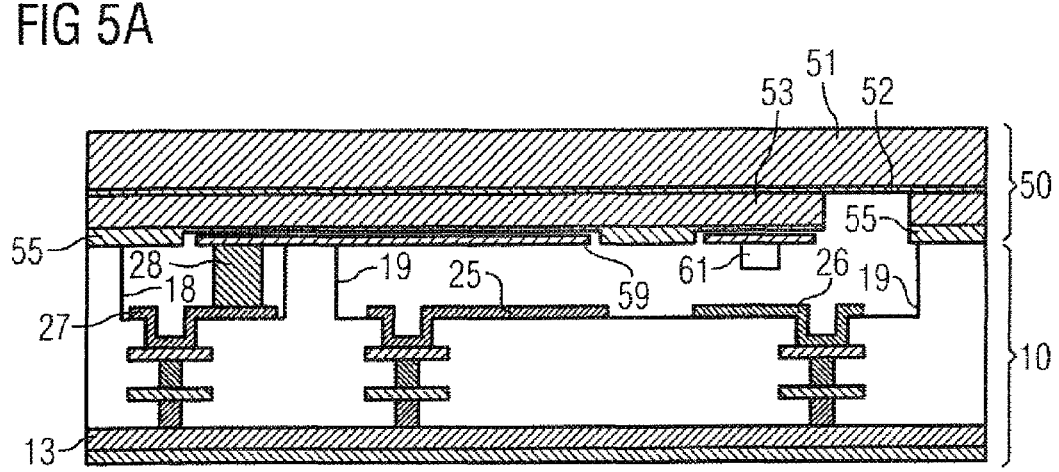
FIGS. 5A and 5B respectively show successive processing steps after connection of the first and second wafers.

FIG. 5A shows a method step after which the wafers 10 and 50 processed corresponding to the previously described steps are connected with one another. The top side 11 of the first wafer 10 and the front side 54 of the second wafer 50 are thereby facing one another. The connection of the first wafer 10 with the second wafer 50 preferably ensues using a bonding method. An electrical connection of the second electrode 59 for electrostatic actuation with the galvanic reinforcement 58 of the first wafer 10 is thereby established. The second electrode 59 for electrostatic actuation is therefore connected to the control circuit.

Figure 5B:
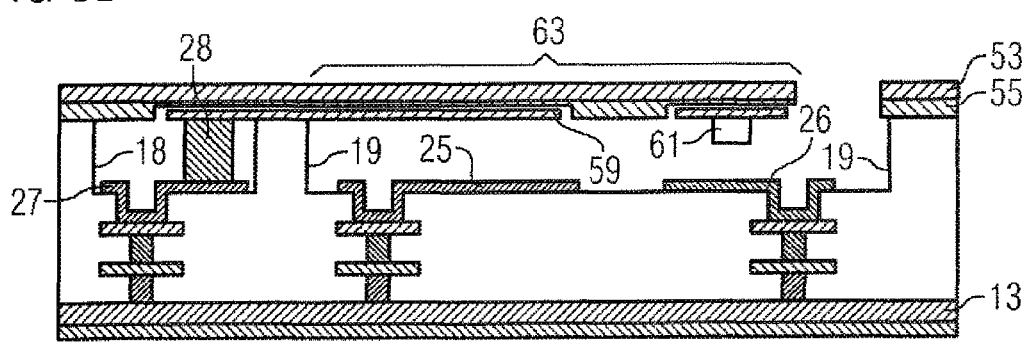

FIG. 5B shows a finished connection device according to the invention after the second wafer 50 has been ground down. The semiconductor layer 51 and the insulation layer 52 have thereby been removed so that henceforth a deformable extension is achieved. By applying corresponding potentials to the first electrode for the connection to the control circuit 27 and the first electrode 25 for electrostatic actuation, an electrical field which leads to a force and therefore deflection of the extension 63 is generated between the electrode 25 and the section of the second electrode 59 that is situated opposite the first electrode 25. The switch contact surface 61 thereby arrives near the first electrode 26 for the load circuit. Those skilled in the art will understand that a further load circuit electrode is located before or after the first electrode 26, and an electrical short between the first electrode 26 and the additional load circuit electrode is caused by the switch contact surface. For example, if the first electrode 26 is connected to an input line and the additional load circuit electrode is connected to an output line, an electrical connection between the transmission/reception device connected to the input line and the transmission/reception device connected to the output line ensues.

Although modifications and changes may be suggested by those skilled in the art, it is the intention of the inventors to embody within the patent warranted heron all changes and modifications as reasonably and properly come within the scope of their contribution to the art.

We claim as our invention:

1. A method for manufacturing a connection device for random connection of a first number of first transmission/reception units with a second number of second transmission/reception units, said connection device comprising a switching matrix comprising a third number of individually controllable micromechanical switching elements, and a control circuit for selective individual activation of the respective micromechanical switching elements, comprising the steps of:

preparing a first semiconductor wafer in which said control circuit is configured, said first semiconductor wafer having a top side, and producing at least one indentation, having dimensions corresponding to an area of a respective micromechanical switching element, in said top side of said first semiconductor wafer and, in said at least one indentation, forming an opening that uncovers a metal layer in said first semiconductor wafer and, after producing said indentation and forming said opening, forming a first electrically conductive layer on said top side of the first wafer and, in said first electrically conductive layer, forming, for each micromechanical switching element, at least one first electrode for electrostatic actuation thereof, a first electrode for a load circuit, and a first electrode for connection to the control circuit;

preparing a second semiconductor wafer and forming a second electrically conductive layer on a front side of the second wafer and, in said second electrically conductive layer, forming, for each micromechanical switching element, at least one second electrode for electrostatic actuation thereof, and at least one second electrode for said load circuit; and connecting said first and second semiconductor wafers by establishing an electrical connection between said first electrode for connection to the control circuit and said second electrode for electrostatic actuation.

2. A method as claimed in claim 1 comprising planarizing said first wafer on said top side thereof before forming said first electrically conductive layer thereon.

3. A method as claimed in claim 1 comprising galvanically reinforcing the electrical connection of said first electrode to said control circuit.

4. A method as claimed in claim 1 comprising forming said second semiconductor wafer as an SOI substrate.

5. A method as claimed in claim 1 comprising applying an insulating layer on said second semiconductor wafer.

6. A method as claimed in claim 5 comprising applying said second electrically conductive layer on said second semiconductor wafer after applying said insulating layer, and structuring said insulating layer so that the subsequently applied second electrically conductive layer is below a surface of said insulation layer.

7. A method as claimed in claim 1 comprising forming said second electrodes by structuring said second electrically conductive layer.

8. A method as claimed in claim 1 comprising generating an extension of said second semiconductor wafer by forming a channel from said front side thereof into an insulation layer buried in said second semiconductor wafer.

9. A method as claimed in claim 8 comprising removing material from said second semiconductor wafer at a backside thereof by grinding or etching to allow said extension to be deflected upon an application of force thereto.

* * * * *